US009896324B2

(12) United States Patent
Dziuk et al.

(10) Patent No.: US 9,896,324 B2
(45) Date of Patent: Feb. 20, 2018

(54) APPARATUS AND METHOD FOR DISPLACING AIR FROM WINE CONTAINERS

(71) Applicants: Timothy W. Dziuk, Austin, TX (US);
Roy Paul Prosise, Cedar Park, TX (US)

(72) Inventors: Timothy W. Dziuk, Austin, TX (US);
Roy Paul Prosise, Cedar Park, TX (US)

( * ) Notice: Subject to any disclaimer, the term of this patent is extended or adjusted under 35 U.S.C. 154(b) by 0 days.

(21) Appl. No.: 14/161,461

(22) Filed: Jan. 22, 2014

(65) Prior Publication Data

US 2014/0263405 A1 Sep. 18, 2014

Related U.S. Application Data

(60) Provisional application No. 61/754,985, filed on Jan. 22, 2013.

(51) Int. Cl.
| | |
|---|---|
| *B65D 39/12* | (2006.01) |
| *B67D 3/00* | (2006.01) |
| *C12H 1/16* | (2006.01) |
| *B67D 7/60* | (2010.01) |
| *B65D 39/00* | (2006.01) |
| *B67D 1/04* | (2006.01) |

(52) U.S. Cl.
CPC ........... *B67D 3/007* (2013.01); *B67D 3/0051* (2013.01); *B67D 3/0067* (2013.01); *C12H 1/16* (2013.01); *B65D 39/00* (2013.01); *B65D 39/12* (2013.01); *B67D 1/045* (2013.01); *B67D 7/60* (2013.01)

(58) Field of Classification Search
CPC ...... B65D 39/00; B65D 39/12; B65D 81/245; B67D 7/60; B67D 1/045; B67D 7/0244; B67D 3/007; B67D 3/0051; B67D 3/0067; C12H 1/16
USPC ........................ 222/153.04, 158, 484, 386.5, 222/464.1–464.3, 481.5, 152, 400.7, 222/394–399, 400.5, 401, 402.1, 387; 215/231, 269
See application file for complete search history.

(56) References Cited

U.S. PATENT DOCUMENTS

| | | | | |
|---|---|---|---|---|
| 2,673,013 | A | * | 3/1954 | Hester ........................ 222/386.5 |
| 3,343,701 | A | * | 9/1967 | Mahoney ...................... 215/231 |
| 4,361,257 | A | * | 11/1982 | Stone, Jr. ............... A47G 19/14 |
| | | | | 222/464.1 |

(Continued)

*Primary Examiner* — Paul R Durand
*Assistant Examiner* — Andrew P Bainbridge
(74) *Attorney, Agent, or Firm* — Rick B. Yeager

(57) ABSTRACT

A device for preventing air from displacing wine poured from a bottle. A retainable spout assembly comprises a bottle seal, a base having a liquid channel and vent channel, and a spout. A disposable bag assembly comprises folded limp inflatable bag attached to a vent tube which is attachable to the vent channel. As wine is poured, air enters the vent tube and inflates the pliable bag. After the bottle contents are consumed, the retainable subassembly may be removed from the disposable subassembly by leaving the disposable subassembly in the bottle or container. The retainable subassembly may be cleaned, and a replacement subassembly attached to the vent channel before inserting into a new container. The air displacement device may be inserted into a bottle before or after pouring wine. A pump or manual blow tube can be used to remove air from a partially-filled bottle.

14 Claims, 8 Drawing Sheets

(56) References Cited

U.S. PATENT DOCUMENTS

| | | | | |
|---|---|---|---|---|
| 4,809,884 | A * | 3/1989 | Stackhouse | 222/153.04 |
| 5,433,346 | A * | 7/1995 | Howe | B65D 77/06 |
| | | | | 222/105 |
| 5,667,110 | A * | 9/1997 | McCann et al. | 222/386.5 |
| 7,395,949 | B2 * | 7/2008 | Ehret et al. | 222/386.5 |
| 8,409,164 | B2 * | 4/2013 | Fangrow | A61J 1/2096 |
| | | | | 222/386.5 |
| 8,522,832 | B2 * | 9/2013 | Lopez | A61J 1/2096 |
| | | | | 141/27 |
| 8,662,358 | B2 * | 3/2014 | Hague | B65D 47/32 |
| | | | | 222/481.5 |
| 9,382,055 | B2 * | 7/2016 | Dziuk | B67D 1/045 |
| 2008/0170963 | A1 * | 7/2008 | Cantrell | B67D 3/00 |
| | | | | 422/41 |
| 2010/0091605 | A1 * | 4/2010 | Rasmussen et al. | 366/107 |
| 2010/0101426 | A1 * | 4/2010 | De Mei | 99/277.1 |
| 2014/0263405 | A1 * | 9/2014 | Dziuk | C12H 1/16 |
| | | | | 222/1 |

* cited by examiner

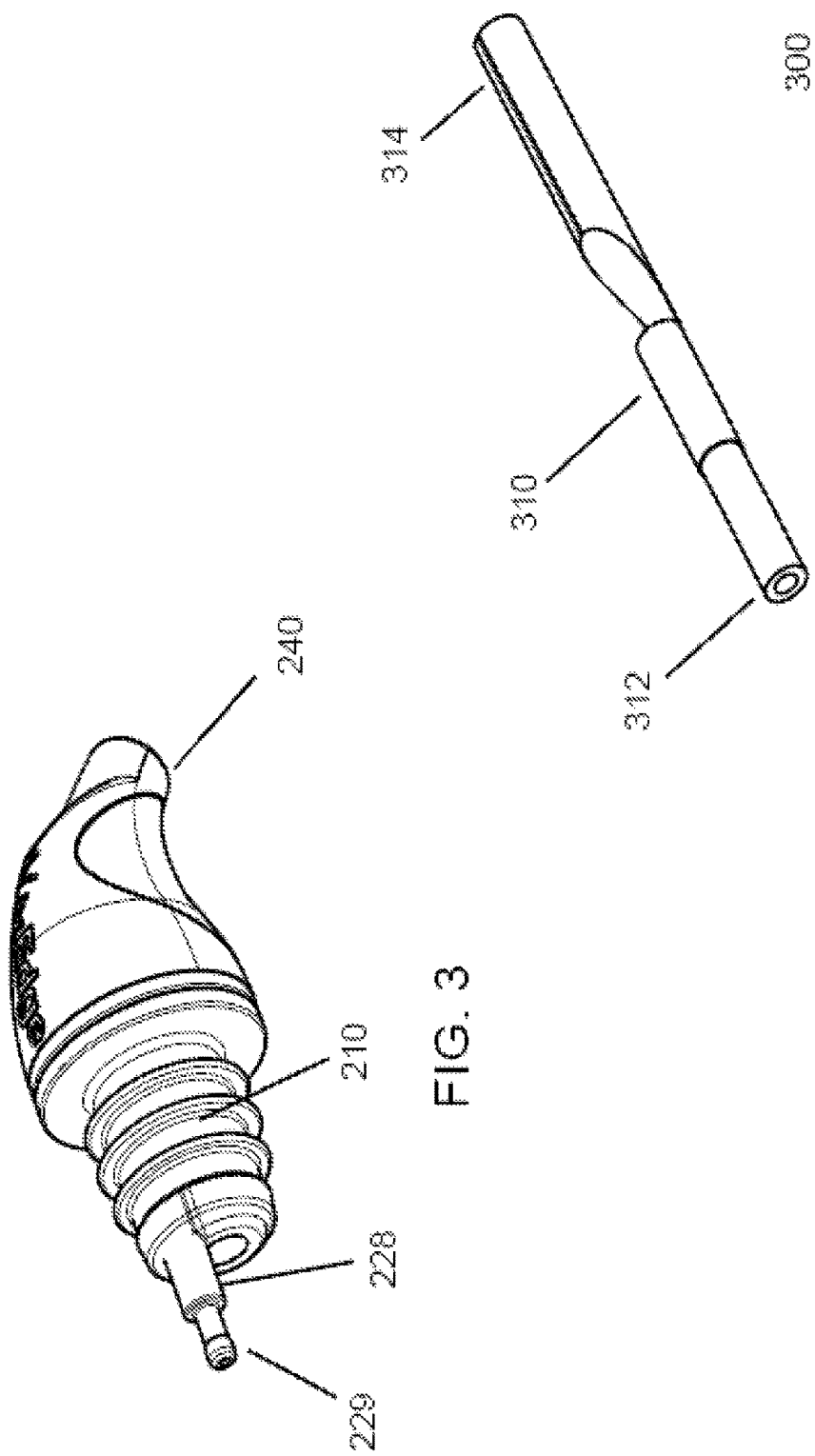

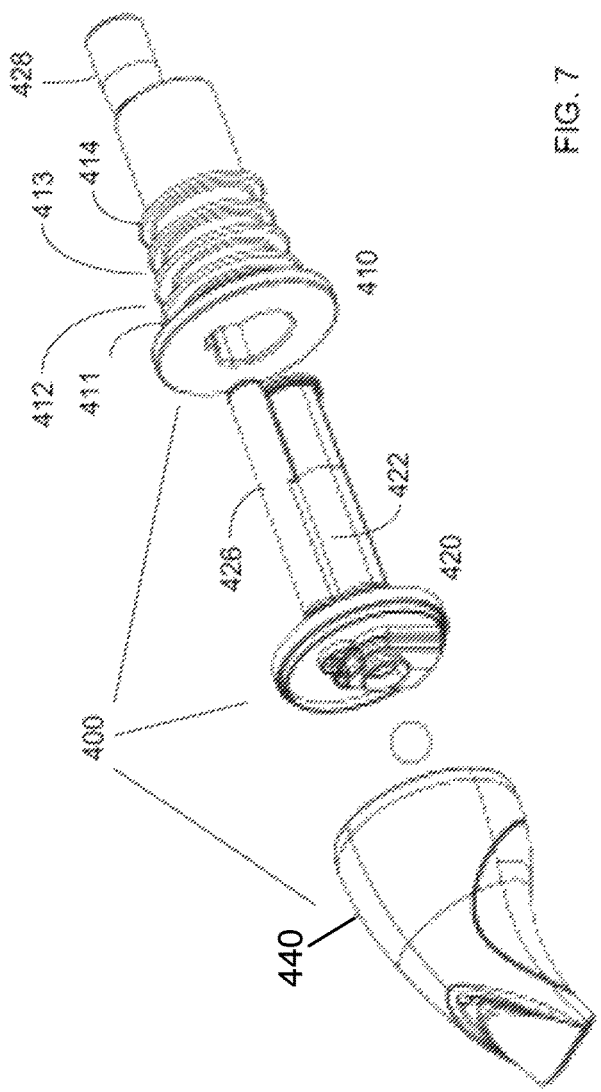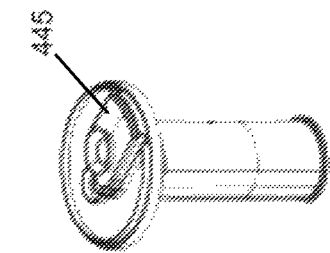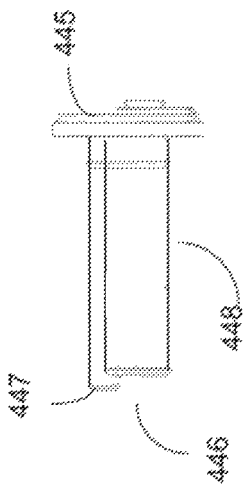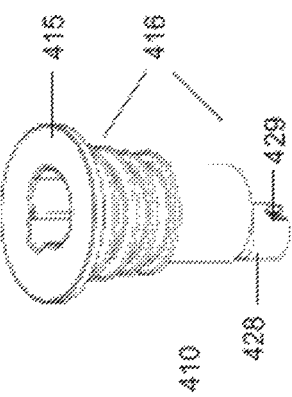

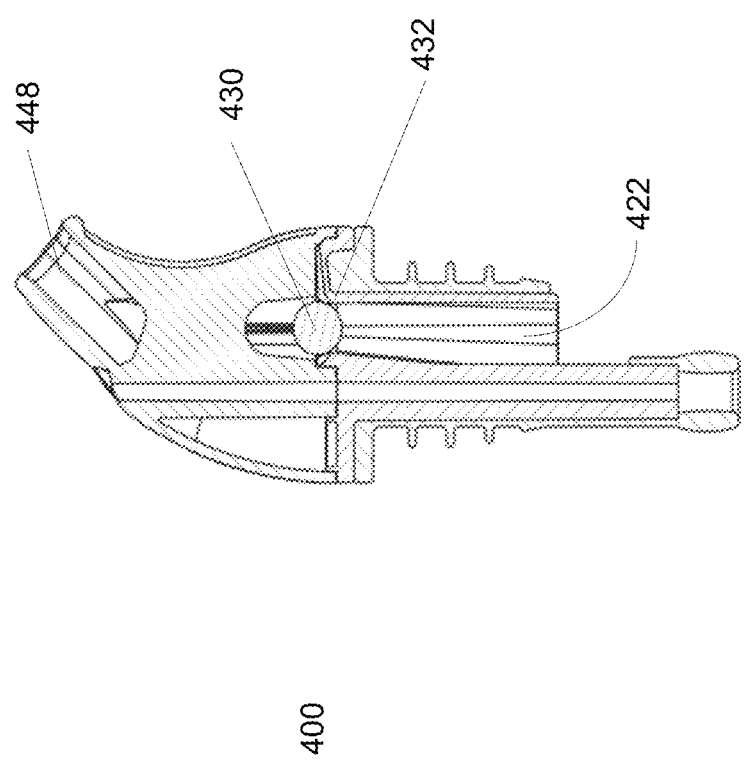

APPARATUS AND METHOD FOR DISPLACING AIR FROM WINE CONTAINERS

This non-provisional US patent application is related to U.S. Provisional Patent Application No. 61/754,985 filed Jan. 22, 2013, and claims priority of that filing date.

BACKGROUND

Field of Invention

The current invention relates to a displacement device and method for preserving wine by displacing air from a wine bottle or storage container.

There is a need for improved devices and methods which provide a simple mechanical displacement of air from a wine bottle or wine container.

Prior Art

Prior art wine preservation techniques include vacuum devices to remove air; inert gases to displace air; and inflatable balloon devices to displace air from a bottle and/or to dispense fluid.

U.S. Pat. No. 4,809,884 to Stackhouse describes a dispenser for controlling the dispensing of a liquid from a container, such as a bottle having an opening through which liquid may be poured, is provided in combination with a bladder insertable within the container and expansible incident to dispensing of liquid for occupying a volume corresponding to that of the dispensed liquid in order to prevent air contamination of any liquid remaining in the container. An improved bladder construction and method of forming same is disclosed.

U.S. Pat. No. 7,395,949 to Ehret et al describes a volumetric displacement dispenser and method of using the dispenser for dispensing liquid contents from an interior of a bottle with a bottle neck while preventing air from filling a void created within the interior of the bottle caused by the liquid contents being poured out of the bottle by gravity. The dispenser includes a stopper having first and second boreholes extending there through, the stopper being adapted to form an air-tight seal when it is seated into the bottle neck. An air pressure tube routed through the first of the boreholes has a first end open to atmospheric air and a second end open to the interior of the bottle. An expandable volumetric displacement balloon is attached to the second end of the air pressure tube and a one-way liquid valve is disposed in the outlet of the liquid flow channel in the stopper.

SUMMARY OF INVENTION

In one embodiment, a displacement device comprises a stopper with a vent channel and a liquid channel. The vent channel is attached to an inflatable bag placed within a wine bottle. As wine is poured from the liquid channel, air enters the vent channel and inflates the bag. In one example, a very pliable bag is provided for a one-time disposable use. Relative to prior art designs, the pliable bag provides advantages in easier inflation, less liquid flow obstruction, and simpler design in eliminating the need for an air vent tube to extend far into the bag.

In one embodiment, a disposable bag assembly comprises an inflatable bag attached to a vent tube. The inflatable bag is folded or rolled so that it can be inserted through the neck of a wine bottle and then unroll or unfold as the bag is inflated. The disposable bag assembly is easily snapped to or otherwise attached to and removed from a retainable spout assembly which comprises a base having a liquid channel and a vent channel, and a pour spout. A liquid check valve such as a ball and ball seat prevents air from entering the bottle through the pour channel. After the bottle contents are consumed, the retainable spout assembly may be removed from the disposable bag assembly by leaving the disposable bag assembly in the bottle or container. The retainable spout assembly may be cleaned, and a replacement disposable bag assembly attached to the vent channel before inserting into a new container such as a wine bottle.

One aspect of the current invention is ease of use. The displacement device may be inserted into a bottle before or after pouring a portion of wine from a wine bottle. The disposable bag assembly can have a low displacement so that it can be inserted into a full bottle of wine. After use, it is not necessary to deflate the bag or to remove the bag from the bottle.

DESCRIPTION OF FIGURES

FIG. 3 is a detailed side view of the retainable spout assembly of the displacement device of FIG. 1 without a tube attached.

FIG. 4 is a side view of the disposable bag assembly of the displacement device of FIG. 1.

FIG. 7 is an exploded perspective view of an alternative spout assembly.

FIG. 8 is a side perspective view of the bottle seal of FIG. 7.

FIG. 9A is a side view of an injection molded internal spout element of FIG. 7.

FIG. 9B is a bottom perspective view of an injection molded internal spout element of FIG. 7.

FIG. 11 is a side cross sectional view of the spout assembly of FIG. 7.

DESCRIPTION OF EMBODIMENT

Displacement Device with Disposable Bag Assembly

FIGS. 1-5 show an example displacement device 100 comprising a retainable spout assembly 200 and a disposable subassembly 300. The following elements are shown in this embodiment.

Figure 1:
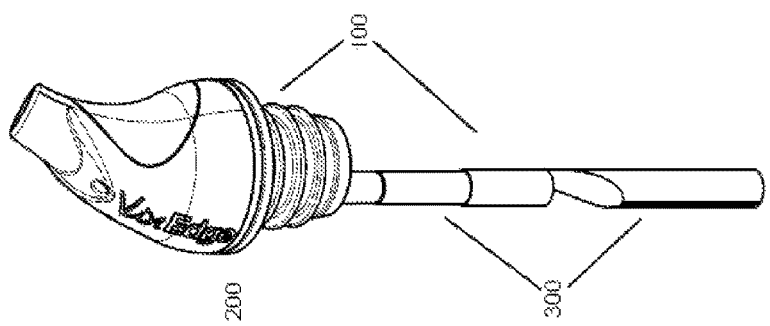
FIG. 1 is a side view of one embodiment of a displacement device with a retainable spout assembly and a disposable bag assembly.
Figure 2:
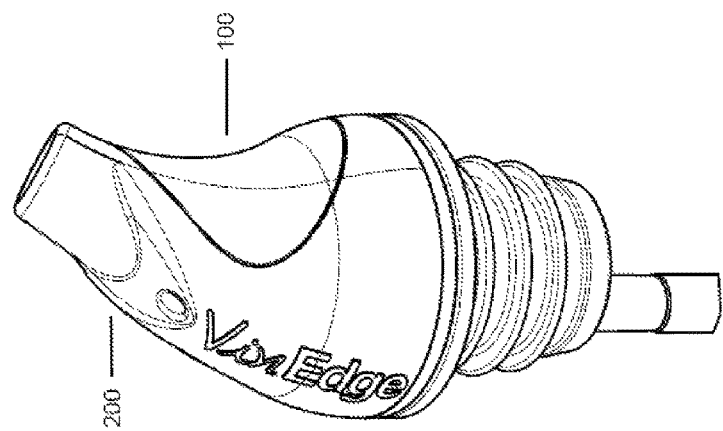
FIG. 2 is a detailed side view of the retainable spout assembly of the displacement device of FIG. 1 with a vent tube attached.

FIG. 2 is a detailed side view of the retainable spout assembly 200 of the displacement device of FIG. 1 with the first end 312 of tube 310 attached to the vent channel extension 228. The bottle seal 210 is configured to be inserted into the neck of a wine bottle 82.

FIG. 3 is a detailed side view of the retainable spout assembly 200 of the displacement device of FIG. 1 without a vent tube attached, and showing vent channel extension 228 and an example snap fitting 229 to mate with the first end 312 of vent tube 310.

FIG. 4 is a side view of the disposable assembly 300 of the displacement device of FIG. 1 showing a sleeve 330 provided over a folded or rolled bag 320 which is attached to the second end 314 of vent tube 310. In this example, the sleeve is removed before the device is inserted into the bottle. In other examples, the folded or rolled bag is provided without a sleeve.

Figure 5:
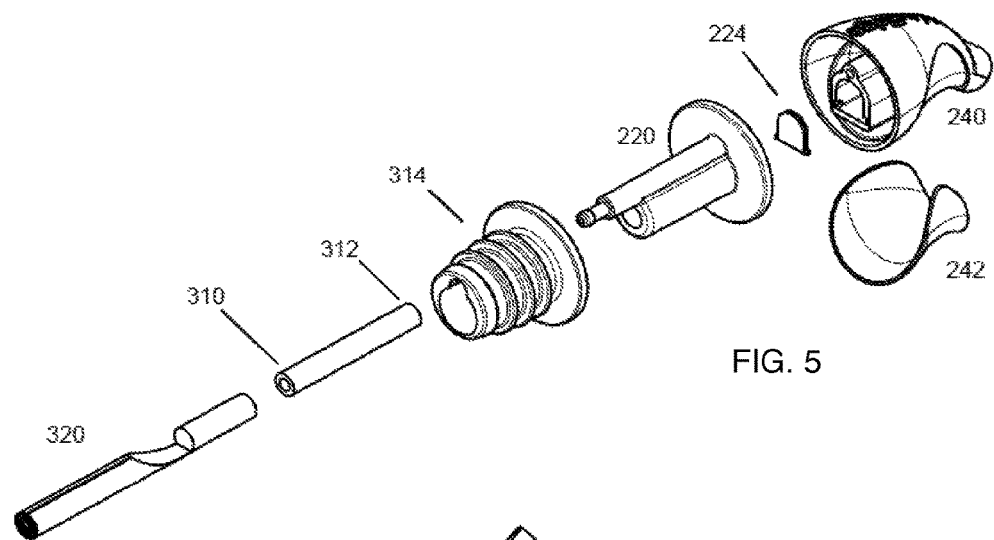
FIG. 5 is an exploded side view of the displacement device of FIG. 1.

FIG. 5 is an exploded side view of the displacement device of FIG. 1. In this example, a container seal is established with the combination of a bottle seal 210 and a base 220. In other examples, a single element may be provided to establish the container seal and provide the liquid and vent channels.

Method of Use

In one example use, a displacement device 100 is inserted into an opened bottle of wine. The displacement device may be inserted before or after a first glass of wine is poured. A bottle seal is established by pushing the bottle seal 210 into the bottle neck.

As a wine is poured from the bottle, the wine travels past the bag into the liquid channel 222 and through the spout 240. After pouring, the flap 224 closes by gravity against the liquid channel 222. As a volume of wine is poured, a corresponding volume of air is drawn into the bag 320 through the vent channel 226 the vent channel extension 228 and the tube 310, thereby partially filling the bag with a volume of air that otherwise would have been in contact with the remaining wine.

As the remaining wine is be stored until later consumption, the bag will remain partially inflated, and thereby help slow the degradation of the wine.

As additional wine is poured from the bottle, the bag will continue to inflate as described above.

After the wine had been consumed, the spout assembly 200 is pulled away slightly from the bottle neck to free the cork. The spout assembly is then pulled upward. In some cases the resistance of the inflated bag will be sufficient to disengage the first end 312 of the tube 310 from the snap fitting 229 of the vent channel extension 222, so that the tube and bag remain in the bottle. In other cases, it may be necessary to grasp the top of the tube and to pull it away from the snap fitting.

The retainable spout assembly 200 may be easily rinsed or washed, and a new disposable bag assembly 300 is attached to the retainable subassembly by pushing the top of the first end of the new tube onto the vent channel extension. The assembled device can then be inserted into a new bottle of wine as described above.

Displacement Device with VinSert™ Disposable Bag Assembly

This embodiment describes a VinEdge™ displacement device with VinSert™ disposable bag assemblies.

Wine Bottle

Figure 6:
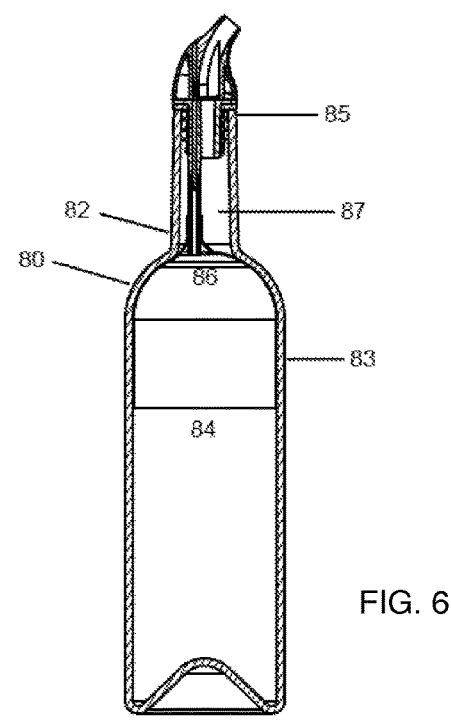
FIG. 6 is a side view of a wine bottle.

Referring to FIG. 6, a wine bottle 80 comprises a neck 82, a side wall 83, and a cork 85 or cap. The side wall has a midpoint 84. In one embodiment, a vent tube 310 is relatively short and extends through the neck, but does not extend to the midpoint 84 of the side wall. The wine bottle has an initial fill level 86 of wine, and an initial volume of air 87 between the cork or cap and the liquid fill level. In one embodiment, the displacement device is sized to displace the initial volume of air from the device. In another embodiment, a pump or blow tube is provided to permit the displacement device to remove air from a partially filled bottle.

Spout Assembly

FIG. 7 is an exploded perspective view of an alternative spout assembly 400 comprising a spout 440, a channel insert 420 with a vent channel 426 and a liquid channel 422, and a bottle seal 410 with a plurality of sealing rings 411, 412, 413, and 414. The bottle seal 410 includes a vent tube recess 428 for accepting a snap-in vent tube on a replacement bag assembly.

FIG. 8 is a side perspective view of the bottle seal 410 of FIG. 7. A vent tube alignment slot 429 is provided on the vent tune recess 428 to permit a desired alignment of the vent tube and replacement bag assembly. The bottle seal 410 is partially insertable into the neck 82 of the wine bottle. When inserted, the bottle seal has an upper portion 415 and a lower portion 416 extending into the neck 82, such that the lower portion has a displacement volume. In one example, he bottle seal is sized so that the sum of the initial air displacement volume of the bottle seal and the displacement volume of the replacement bag assembly is approximately the same as the initial volume of air in the neck of the wine bottle.

FIG. 9B is a bottom perspective view of an internal spout element. FIG. 9A is a side view of the internal spout element 444 showing a proximal end 445 that attaches to the channel insert 420, and a distal end 446. A spout vent channel 447 provides a path from the channel insert vent channel 426 to the end of the spout. A spout liquid channel 448 provides a path from the channel insert liquid channel 422 to the end of the spout.

Liquid Channel Air Seal

In this embodiment, an air seal is provided in the liquid channel, such that liquid may pass through or around the air seal as wine is poured, and such that the air seal prevents air from entering the wine bottle after wine is poured through the liquid channel. FIG. 11 is a side cross sectional view of the spout assembly 400 of FIG. 7. A continuous vent channel is provided through the tube insert 420 vent channel 426 and the spout vent channel 447. A continuous liquid channel is provided through the tube insert 420 liquid channel 422 and the spout liquid channel 448. In one example, a bag is formed by a weld seal 524 around the edges of an overlapping first side and second side.

In this example a liquid valve function is provided by a ball 430 and ball seat 432. After wine is poured and the bottle is placed in an upright position, the ball 430 drops into the ball seat 432 in order to provide a seal to prevent air from entering the liquid channel 448 in the tube insert. In one example, the ball seat is a TPE gasket. In one example, a 15 degree taper on the ball seat with a ¼ inch diameter stainless steel ball provides an air seal. In other examples one or two extra balls are provided on top of the first ball so that there is additional weight against the ball seat. In another example, an elongated plug is used, where the elongated plug has a rounded bottom that seats in the ball seat.

VinSert™ Disposable Bag Assemblies

In this embodiment, a plurality of VinSert™ disposable bag assemblies are provided to attach to the spout assembly.

Figure 12:
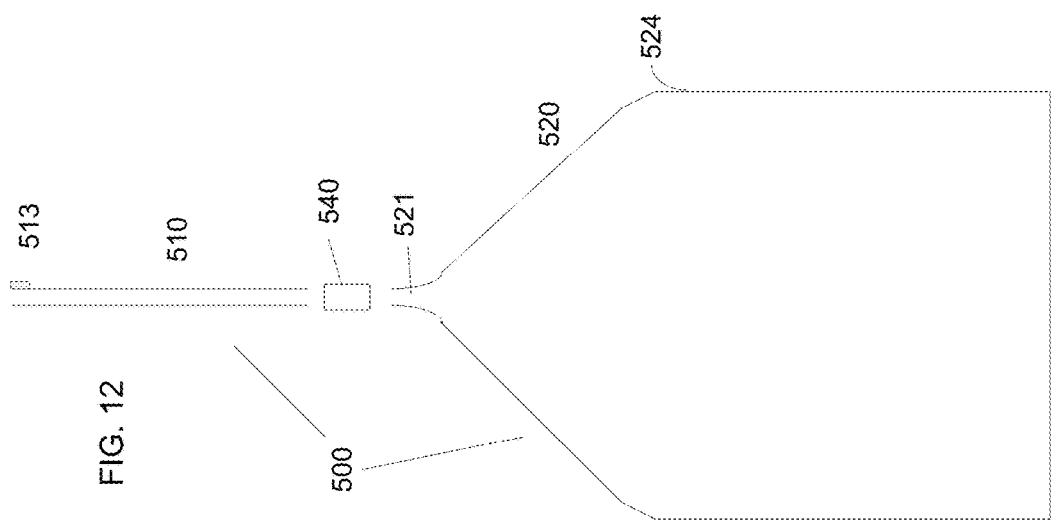
FIG. 12 is an exploded side view of a replacement bag assembly.

FIG. 12 is an exploded side view of a replacement bag assembly 500 comprise a vent tube 510 with a proximal end, attachable to the vent channel, and a distal end; and a pliable inflatable bag 520 with a top opening 521 secured around the vent tube 510. An alignment key 513 on the distal end of the vent tube is snapped into the vent tube alignment slot 429 shown in FIG. 8.

In one example, the pliable inflatable bag further includes an angled or curved neck portion 522. An angled neck on the bag is found to have permitted effective bag inflation in a variety of bottle shapes having long, short, or medium length bottle necks. The neck of the bag is attached to the vent tube, such as by adhesive, weld, or compression sleeve. In FIG. 12 a compression silicon seal 540 secures the bag to the vent tube.

The pliable inflatable bag is folded and rolled such so that the bag can unroll or unfold in the bottle as air enters the bag. In one example, the bag is folded along a first horizontal axis; then folded in thirds along two spaced apart vertical axes; then folded along a second horizontal axis, then rolled from left to right. This parachute fold permits the bag to unroll and unfold as air pushes upward in the unfolding bag. The bag unfolds toward the bottom of the bottle and upwards relative to the spout orientation when the bottle is tilted for pouring.

In one example, the folded bag is provided in a package so that the bag is kept clean before use.

In one example, the bag is a 1 mil thick polyethylene.

Air Channel Seal

Figure 13:
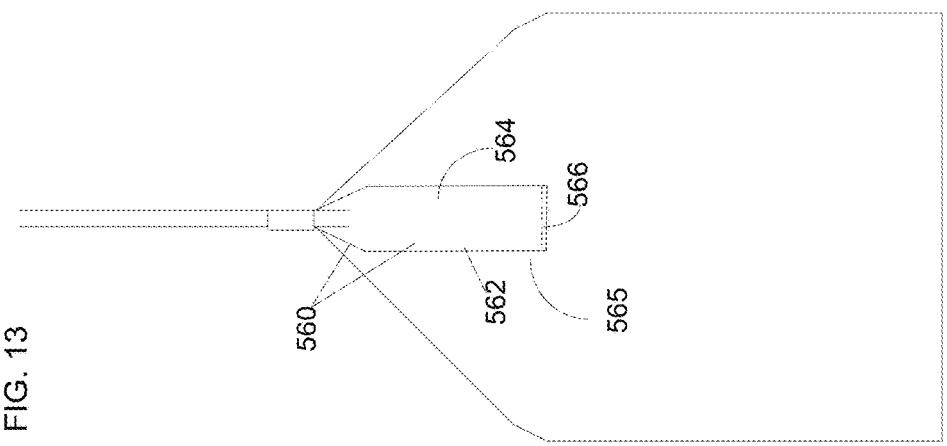
FIG. 13 is a side view of an air channel seal provided at the bottom of the vent tube inside the inflatable bag of FIG. 12.

FIG. 13 shows a simple and low pressure air channel seal 560 provided at the bottom of the vent tube inside the inflatable bag. In this example, a flat sleeve 562 has a first side 564 and a second side 566 which are normally in a closed orientation. As air flows through the vent tube, the first side and second side are temporarily forced apart to permit air to enter the inflatable bag. When air stops flowing through the vent tube and sleeve, the first side and second side collapse to the closed orientation and block air movement out of the bag. This collapsing provides a one-way valve for air entering the inflatable bag. In one example, sleeve is formed by a weld seal 565 of the side edges the overlapping first side 564 and second side 566.

Pump

Figure 14:
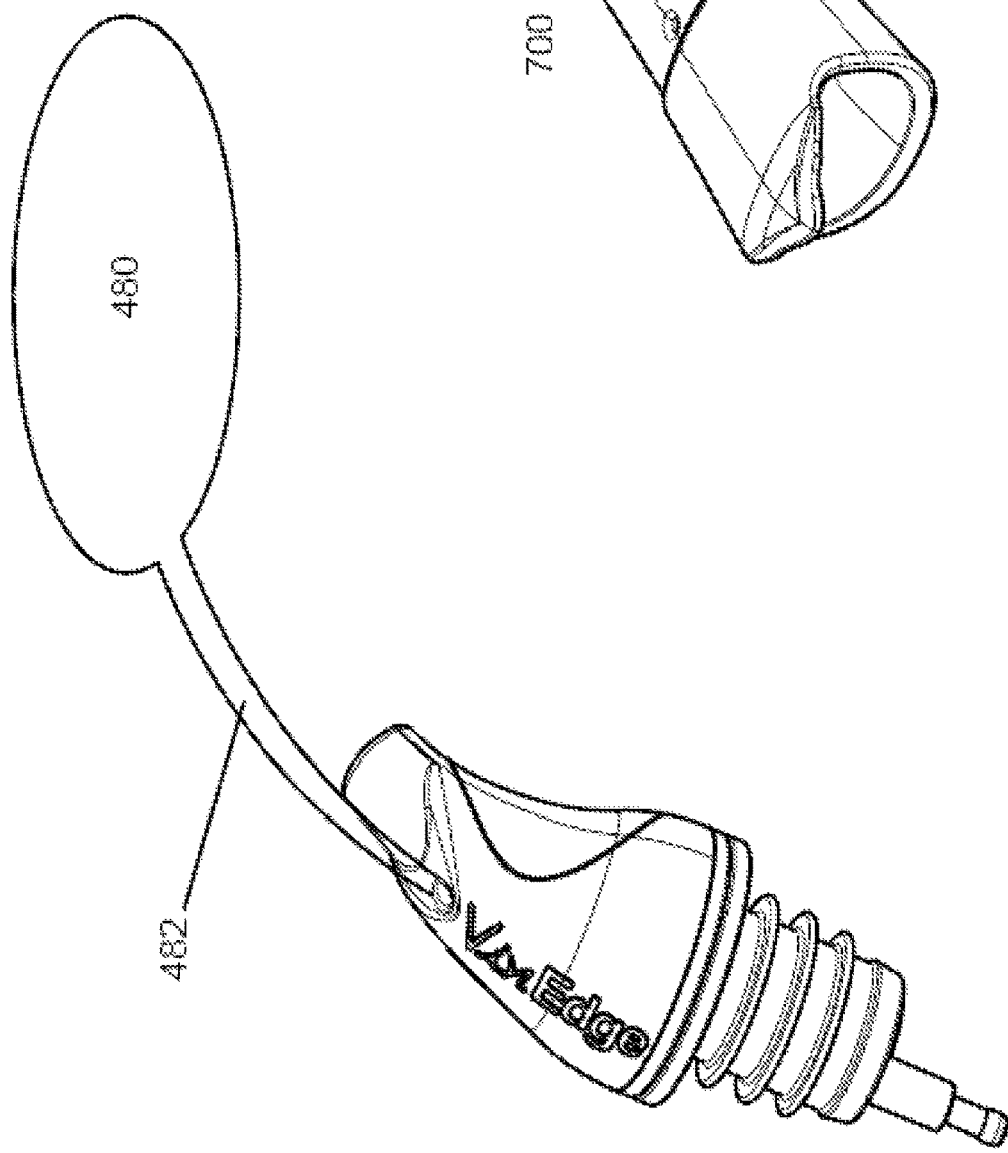
FIG. 14 is a side view of an air pump with a supply tube attached to a spout.

FIG. 14 shows an air pump 480 with a supply tube 482 attached to the spout. In one embodiment, the displacement device is inserted into a wine bottle after a portion of the wine is poured from the bottle. The pump is attached to the spout so that air may be directed from the air pump 480 through the vent channel 426 in order to inflate the bag. As the bag inflates, air within the bottle is displaced through the liquid channel. Bag inflation is continued until air is removed from the bottle and wine enters the liquid channel. In one example the air pump is a squeeze bulb. In another example the supply tube may be used as a blow tube so that a person may blow air through the vent channel and vent tube into the inflatable bag.

In a typical example, about half of the wine is poured from a bottle, such as at a home or restaurant, and the displacement device with pump or blow tube permits the wine remaining in the bottle to be stored without exposure to air.

A low cost version can eliminate the decorative spout and provide a simple plug or cork with the air channel, liquid channel, and a simple cap, sealing flap for the seal on the top of the liquid channel. In a low cost version, the vent tube and inflatable bag may be pre-attached to the air channel. In one example, the low cost version is intended to serve as a removable stopper for the remainder of the wine in the bottle after partial consumption.

Storage Base

Figure 10:
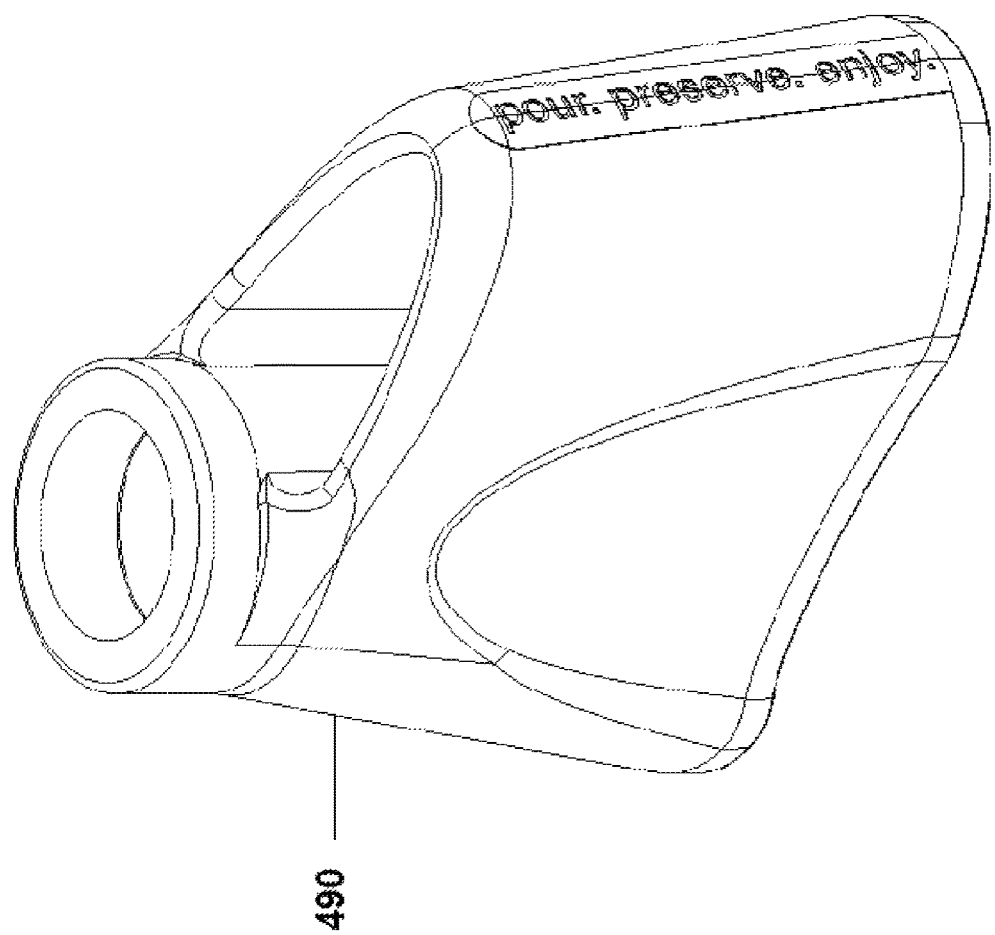
FIG. 10 is a side perspective view of a storage base.

FIG. 10 is a side perspective view of a storage base 490 for holding the spout assembly 400 and a plurality of VinSert™ replacement bag assemblies.

Kit

In one example, a kit comprises a reusable spout assembly, a plurality of replacement bag assemblies, and a storage base. In another example, a kit includes a pump and supply tube.

Aerator

Figure 15:
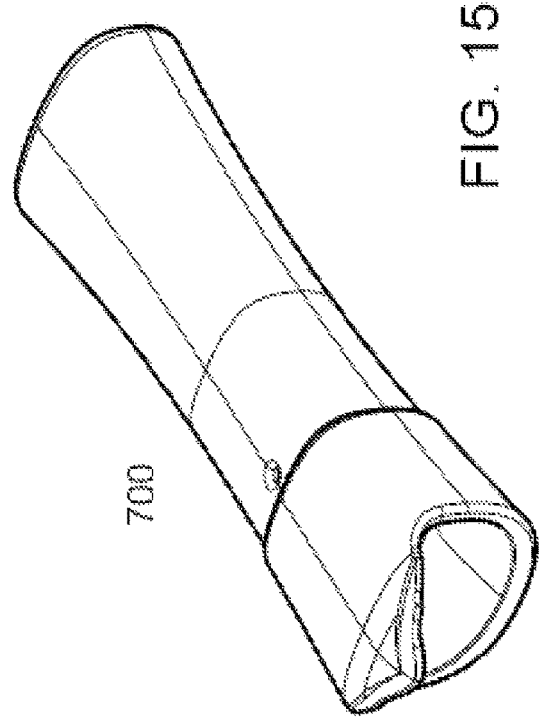
FIG. 15 is a side perspective view of an aerator which is attachable to a pour spout.

In one embodiment, the spout includes an aerator 700 such as shown in FIG. 15. In this example, the aerator may be removably attached to the spout by snapping the aerator onto the end of the spout.

Method of Use—Inserting the Displacement Device Before Pouring Wine

In one example method of use, a kit provides a reusable spout assembly, a plurality of pre-packaged VinSert replacement bag assemblies, and a storage base.

The spout assembly is stored in the base until use. The top of a VinSert package containing a replacement bag assembly is carefully opened to expose the proximal end 512 of the vent tube 510 and the vent tube alignment key 513. The VinSert assembly is connected to the spout assembly while the bag is contained in the package.

While holding the package tightly in one hand, and the spout in the other hand, the proximal end of the vent tube is inserted into the vent tube recess 428 of the bottle seal 410. The spout and bag side of the VinSert should face the same direction in order to provide more room for the Zvinsert to unroll and unfold.

A bottle of wine is opened. The Vinsert and bottle seal are inserted into the top of the wine bottle of wine. The displacement device may be inserted before of wine is poured. A bottle seal is established by pushing the bottle seal 410 into the bottle neck.

In one example, the combined displacement of a replacement bag assembly and the lower portion 416 of the spout assembly slightly exceeds the initial volume of air 87 which is present in the unopened bottle of wine. In this example, the bottle is opened and the spout assembly is inserted before pouring wine from the bottle. As the spout assembly is inserted, the initial air in the neck of the bottle is forced out of the neck around the spout assembly or through the liquid channel. After the air is displaced, a small volume of wine may enter the lower portion of the liquid channel.

As the bottle is tilted to pour wine, air enters the inflatable bag, and the bag continues to unroll or unfold and to expand. As additional wine is poured, the bag inflates further. The wine flows around the pliable bag toward the liquid channel in the bottle seal.

After pouring, the ball 430 seals against the ball seat 432 by gravity to prevent air from entering the liquid channel.

When the contents are emptied from the bottle, the bottle seal is pulled upwards to remove it from the bottle. The bag and vent tube are designed to be released from the bottle seal, and may remain in the bottle. The spout assembly may be rinsed or cleaned and stored in the base. This process may be repeated with a new VinSert replacement bag assembly.

Method of Use—Inserting the Displacement Device After Pouring Wine

The displacement device may be inserted into the wine bottle neck after a portion of wine is poured. In one example, the method is similar to the steps described above, except that a pump or blow tube is used to inflate the bag sufficiently to displace air from the bottle. In the pump example, one end of a supply tube 482 is inserted into the spout vent channel 447, and the other end of the supply tube is attached to a squeeze bulb. In the manual example, one end of a supply tube 482 is inserted into the spout vent channel 447 and a person blows into the other end of the supply tube in order to inflate the bag.

Description of Embodiment™ Other Air Displacement Applications

The bottle seal in the embodiments above are configured to be inserted into the neck of a wine bottle 82. In other examples, this device or a similar device may be used to prolong the useful life of other fluids including juices, milk, olive oil, etc.

While an exemplary embodiments of the invention have been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A kit for preventing air from displacing wine poured from a wine bottle, the wine bottle comprising a neck and side walls, and the wine bottle having a cork or cap, an initial fill level of wine, and an initial volume of air between the cork or cap and the liquid fill level, the kit comprising
    a device for preventing air from displacing wine poured from a bottle the device comprising
        a spout assembly comprising
            a base partially insertable into the neck of the wine bottle, such that when inserted, the base has a lower portion extending into the neck, such that the lower portion has an initial air displacement volume, the base comprising
                a seal between the base and the neck of the wine bottle,
                a liquid channel through the base,
                and a vent channel through the base, and
                a pour spout; and
        a plurality of disposable replacement bag assemblies, each replacement bag assembly having a displacement volume, each replacement bag assembly consisting of
            a vent channel extension which does not extend below the midpoint of the bottle side wall, the vent channel extension comprising
                a proximal end, attachable to the vent channel, and
                a distal end, and
            a pliable inflatable bag comprising
                a top opening secured around the vent channel extension, such that the pliable inflatable bag is rolled or folded, such that the bag unrolls or unfolds downwardly with respect to the neck of the wine bottle after the replacement bag assembly is placed in the wine bottle,
        such that the sum of the initial air displacement volume of the base and the displacement volume of the replacement bag assembly is approximately the same as the initial volume of air in the neck of the wine bottle; and
    a storage base for holding the device and the plurality of replacement bag assemblies.

2. The displacement device of claim 1 wherein the pliable inflatable bag is approximately 1 mil thick polyethylene.

3. The displacement device of claim 1 wherein the pliable inflatable bag further comprises an angled or curved neck portion.

4. The displacement device of claim 1 wherein the pliable inflatable bag is folded and then rolled, such that the pliable bag is folded along a first horizontal axis, then folded in thirds along two spaced apart vertical axes, then folded along a second horizontal axis, and then rolled.

5. The device of claim 1 wherein the replacement bag assembly further comprises a package that protects and contains the rolled or folded bag.

6. The device of claim 1 wherein the neck of the pliable inflatable bag is attached to the vent channel extension by adhesive, weld, or compression sleeve.

7. The device of claim 1 wherein the proximal end of the vent channel extension snaps into the vent channel;
    an alignment key is provided on the proximal end of the vent channel extension, and an alignment slot is provided on the vent channel, such that the key mates with the slot to align the vent channel extension to a desired orientation offset from a vertical centerline of the wine bottle; and
    the pliable inflatable bag is folded or rolled so that the bag unrolls and unfolds downwardly and toward the vertical centerline of the wine bottle.

8. The device of claim 1 wherein the seal further comprises
    a plurality of sealing rings extending from the base, such that the sealing rings engage the inside neck of the wine bottle.

9. The device of claim 1 wherein the liquid channel further comprises
    an air seal, such that liquid may pass through or around the air seal as wine is poured, and that the air seal prevents air from entering the wine bottle after wine is poured through the liquid channel.

10. The device of claim 9 wherein the air seal comprises a ball, and
    a ball seat formed in the liquid channel.

11. The device of claim 1 further comprising
    an air pump attachable to the vent channel, such that the air pump can force air into the vent channel and through the vent channel extension, thereby inflating the pliable inflatable bag.

12. The device of claim 1 wherein the spout further comprises
    an aerator, removably attached to the spout.

13. The device of claim 1 wherein the replacement bag assembly further comprises
    a collapsible sleeve extending from a top inside portion of the pliable inflatable bag, the sleeve comprising
        a top portion attached to the vent channel extension; and a collapsible open bottom portion, such that the bottom portion includes a first side and a second side which are spaced apart when air flows through the vent channel extension, and are collapsed together when air does not flow through the vent channel extension, thereby serving as a one-way valve for air entering the inflatable bag.

14. A method of preventing air from displacing wine poured from a bottle, the wine bottle comprising a neck, a side wall with a midpoint, a cork or cap, an initial fill level of wine, and an initial volume of air between the cork or cap and the liquid fill level, the method comprising
  providing a device for preventing air from displacing wine poured from the wine bottle, the device comprising
    a spout assembly comprising
      a base partially insertable into the neck of the wine bottle, such that when inserted, the base has a lower portion extending into the neck, such that the lower portion has an initial air displacement volume, the base comprising
        a seal between the base and the neck of the wine bottle,
        a liquid channel through the base,
        and a vent channel through the base, and
      a pour spout;
  providing a plurality of disposable replacement bag assemblies having a displacement volume, each replacement bag assembly comprising
    a vent channel extension which does not extend below the midpoint of the bottle side wall, the vent channel extension comprising
      a proximal end, attachable to the vent channel, and a distal end, and
    a pliable inflatable bag comprising
      a top opening secured around the vent channel extension, such that the pliable inflatable bag is rolled or folded, such that the bag unrolls or unfolds downwardly with respect to the neck of the wine bottle after the replacement bag assembly is placed in the wine bottle,
  such that the sum of the initial air displacement volume of the base and the displacement volume of the replacement bag assembly is approximately the same as the initial volume of air in the neck of the wine bottle;
  attaching a replacement bag assembly to the base of the device;
  opening the bottle of wine;
    inserting the device into the neck of the wine bottle before pouring a first portion of wine from the bottle, such that an inflatable bag is permitted to unroll or unfold in the wine bottle;
    pouring a first portion of the wine from the bottle through the device at a first time; such that a volume of displacement air flows from the vent channel through the vent tube and partially inflates the pliable inflatable bag so that a first volume of displacement air is contained in the pliable inflatable bag, and such that wine flows around the pliable inflatable bag into the liquid channel;
    pouring a second portion of wine from the wine bottle through the device at a later time; and
    removing the base of the device from the wine bottle and attaching a new replacement bag assembly to the base.

* * * * *